United States Patent [19]

Hengel et al.

[11] Patent Number: 5,055,539
[45] Date of Patent: Oct. 8, 1991

[54] MOLDING MADE FROM A VINYLIDENE FLUORIDE COPOLYMER AND PROCESS FOR ITS PRODUCTION

[75] Inventors: Rolf Hengel, Burgkirchen; Heinz Notzon, Altötting, both of Fed. Rep. of Germany

[73] Assignee: Hoechst Aktiengesellschaft, Frankfurt am Main, Fed. Rep. of Germany

[21] Appl. No.: 350,248

[22] Filed: May 11, 1989

[30] Foreign Application Priority Data

May 13, 1988 [DE] Fed. Rep. of Germany ....... 3816327

[51] Int. Cl.$^5$ .............................................. C08F 14/22
[52] U.S. Cl. .................................... 526/254; 522/156
[58] Field of Search ......................... 526/254; 522/156

[56] References Cited

U.S. PATENT DOCUMENTS

| Re. 25,904 | 11/1965 | Timmerman | 522/156 |
|---|---|---|---|
| 3,023,196 | 2/1962 | Bro | 526/254 |
| 3,116,226 | 12/1963 | Bowers, III | 522/156 |
| 3,616,371 | 10/1971 | Ukihashi et al. | 526/254 |
| 3,718,558 | 2/1973 | Tabata et al. | |
| 3,738,923 | 6/1973 | Carlson et al. | |
| 3,845,024 | 11/1972 | Weaver | 526/254 |
| 4,027,086 | 5/1977 | Lo Valve et al. | 526/254 |
| 4,076,929 | 2/1978 | Dohany | 522/156 |
| 4,123,603 | 10/1978 | Stewart, Jr. | 526/254 |
| 4,335,238 | 6/1982 | Moore et al. | 526/254 |
| 4,577,005 | 3/1986 | Sako et al. | 526/254 |
| 4,579,881 | 4/1986 | Masuhara et al. | 526/254 |
| 4,652,592 | 3/1987 | Kawashima et al. | |
| 4,696,989 | 9/1987 | Oka et al. | 526/254 |
| 4,742,126 | 5/1988 | Moggi et al. | |
| 4,808,352 | 2/1989 | Bhateja | 522/156 |
| 4,830,920 | 5/1989 | Hayashi et al. | 526/254 |

FOREIGN PATENT DOCUMENTS

| 60-81213 | 5/1985 | Japan | 526/254 |
|---|---|---|---|
| 61-159410 | 7/1986 | Japan | 526/254 |
| 61-112611 | 5/1987 | Japan | 526/254 |
| 888765 | 2/1962 | United Kingdom | 526/254 |

Primary Examiner—Joseph L. Schofer
Assistant Examiner—N. Sarofim

[57] ABSTRACT

A molding is produced by thermoplastic shaping of at least one partially crystalline polymer which comprises, exclusively, polymerized units of vinylidene fluoride and other fluorine-containing monomers which contain only one C=C double bond, contains 20 to 50% by weight of polymerized units of vinylidene fluoride and has a melt index of at least 1 g/10 min at 250° C. and 11 kg load, without addition of substances which contain polymerizable double bonds, and the molding is subsequently treated with a minimum dose of 50 kGY of ionizing rays at a minimum dose rate of 2 Gy/s. Moldings are thus obtained in a simple manner which have good mechanical and chemical properties and exhibit no discoloration.

2 Claims, No Drawings

MOLDING MADE FROM A VINYLIDENE FLUORIDE COPOLYMER AND PROCESS FOR ITS PRODUCTION

DESCRIPTION

The invention relates to moldings made from a vinylidene fluoride copolymer and which have been treated with ionizing radiation, as claimed in claim 1, and a process for their production as claimed in claim 5.

The improvement of high temperature properties of thermoplastically processed copolymers of ethylene and tetrafluoroethylene or chlorotrifluoroethylene by treatment with ionizing radiation at above 60° C. is disclosed in U.S. Pat. No. 3,738,923. A similar process is disclosed by U.S. Pat. No. 3,718,558 in which an elastomeric copolymer of tetrafluoroethylene and propylene, optionally with further monomers, is irradiated. Disadvantages of the process are that very high temperatures, generally over 300° C., are necessary for thermoplastic shaping of the copolymers of tetrafluoroethylene and ethylene, and the copolymers of tetrafluoroethylene and propylene have only a low strength at room temperature.

The improvement of the mechanical properties of a molding made from a fluorine-containing graft copolymer by treatment with ionizing radiation is further disclosed in U.S. Pat. No. 4,652,592. The graft copolymer can be obtained, for example, from vinylidene fluoride, chlorotrifluoroethylene and an unsaturated peroxy compound, for example t-butylperoxyallyl- carbonate, triallyl isocyanurate being admixed. These moldings exhibit inferior chemical resistance and heat resistance compared with those whose polymer component wholly comprises fluorinated compounds. The production process is difficult due to the compounding process and the possibility that undesired reactions occur (so-called scorching) even during thermoplastic shaping.

Finally, U.S. Pat. No. 4,742,126 discloses a process in which copolymers of vinylidene fluoride with hexafluoropropene and/or chlorotrifluoroethylene and optionally tetrafluoroethylene are treated in solution in a water-immiscible solvent in the presence of water with a phase transfer catalyst and an inorganic base, C=C double bonds being formed in the copolymer. These copolymers are said to be crosslinkable by ionizing radiation without further additives containing a plurability of C=C double bonds. No further details are given on this subject. This process also is very expensive. Moreover, it inevitably leads to strongly discolored products.

A process has now been found which enables improved moldings to be produced without the disadvantages described above. A molding of this kind, produced by thermoplastic shaping of a fluorine-containing polymer, which has a melt flow index of at least 1 g/10 min measured at 250° C. with an 11 kg load, and with which 0 to 20% by weight, based on the molding, of one or more inert additives are mixed, with subsequent treatment with ionizing radiation, is characterized in that the polymer component of the molding comprises, exclusively, polymerized units of vinylidene fluoride and other fluorine-containing monomers, which contain only one C=C double bond, contains a maximum of 50% by weight, based on the polymer component, of polymerized units of vinylidene fluoride and has a crystalline melting point of 100° C. to 240° C., the molding having an elongation at break of at least 250% at room temperature and a torsional shear modulus at 250° C. of at least 0.5N/mm² and having no measurable melt flow index at 11 kg load.

The following methods are suitable for example for measuring the said physical characteristics:

melt flow index in accordance with DIN 53 735; torsional shear modulus in accordance with DIN 53 445; elongation at break in accordance with DIN 53 455 and crystalline melting point by means of differential thermal analysis.

The polymer component of the molding should comprise, exclusively, polymerized units of vinylidene fluoride and other fluorine-containing monomers which have only one C=C double bond. With the exception of vinylidene fluoride itself, one or more of these fluorine-containing monomers may be present, preferably those of the formula $$YZC=CF-R_f$$

in which the symbols have the following significance,
Y=F, Cl, H
Z=F, Cl, H and
$R_f$=F or $CF_3$.

Examples of suitable copolymers are those of vinylidene fluoride and hexafluoropropene, of vinylidene fluoride and chlorotrifluoroethene, of vinylidene fluoride and tetrafluoroethene, copolymers of vinylidene fluoride, tetrafluoroethene, and hexafluoropropene being particularly preferred. The production of copolymers of this type is carried out for example by polymerization of the monomer components under pressure in the aqueous phase in the presence of at least one emulsifier, one buffer, at least one initiator and a chain transfer agent. After polymerization, the resulting polymer dispersion is converted to the gelled state by addition of a strong mineral acid, for example hydrochloric acid, and the gel is granulated using a water-immiscible solvent, for example trichlorotrifluoroethane or solvent naphtha, and after removal of the major part of the solvent the granulate is dried in the fluidized bed. Suitable production processes are described, for example, in the U.S. Pat. Nos. 3,006,881; 3,072,590; 3,163,628, 2,468,054, 2,968,649 and 4,123,603 and in British Patent 827,308; DE-OS 2,635,402 and EP-OS 50,437. All these copolymers of vinylidene fluoride can in particular, also be produced in the presence of permanganates as initiators, as described in U.S. Pat. No. 3,632,847.

The polymer component of the molding should contain between 20 and 50% by weight, based on the polymer component, of polymerized units of vinylidene fluoride. At both higher and lower vinylidene fluoride contents a deterioration of the mechanical properties at room temperature occurs during radiation, particularly that of elongation at break. Particularly good results are obtained, when the polymer component comprises the following polymerized units:

a) 20 to 50% by weight of vinylidene fluoride; b) 35 to 70% by weight of tetrafluoroethene; c) 10 to 30% by weight of hexafluoropropene, with the proviso that the quantities a+b+c make up 100% by weight, the percent by weight data being based on the polymer component.

The polymer component of the molding should be partially crystalline, that is, it should contain 10 to 70% by weight of crystalline components and have a crystalline melting point of 100° to 240° C., measured by differential thermal analysis.

Polymers having a melting point of below 100° C. are too soft for the intended applications. Above 240° C., the processibility is more difficult and an essential advantage for the production of the molding is thereby lost.

The molding may contain up to 20% by weight, based on the molding, of one or more inert additives. Inert additives of this type are, for example, inorganic pigments such as iron oxides, cadmium pigments, chromium oxides, aluminum sodium silicates containing sulfite, titanium dioxide, carbon black or graphite; organic pigments or pigment preparations, such as "PV-Echtpigmente" (manufactured by Hoechst AG), furthermore, fillers such as powdered quartz, slate flour, talc, precipitated and natural calcium carbonates, kaolin, barium sulfate, zinc oxide, aluminum hydroxide, mica, wollastonite, metal powders, for example iron, chromium, nickel, aluminum, titanium and their alloys; additionally reinforcement materials, such as fibers of glass, plastic, ceramic, polyester, polyamide, polytetrafluoroethylene, it also being possible for the fibers to be present in the form of fabrics.

The moldings according to the invention are produced by the process described below, to which the invention also relates:

At least one thermoplastic fluorine-containing polymer as a mixture with 0 to 20% by weight, based on the mixture, of additives, is shaped at 120 to 350° C. to a molding and subsequently exposed to ionizing radiation, with the feature that the fluorine-containing, thermoplastic polymer comprises, exclusively, polymerized units of vinylidene fluoride and other fluorine-containing monomers, which contain only one C=C double bond, contains 20 to 50% by weight based on the polymer, of polymerized units of vinylidene fluoride, has a crystalline melting point of 100° to 240° C. and a melt flow index of at least 1 g/10 min, measured at 250° C. with 11 kg load, no materials being added which contain polymerizable double bonds and the irradiation being carried out with a dose of at least 50 kGy and a dose rate of at least 2 Gy/s.

Particularly good results are obtained, when a thermoplastic, fluorine-containing polymer is used, which comprises the following polymerized units: a) 20 to 50% by weight of vinylidene fluoride; b) 35 to 70% by weight of tetrafluoroethene; c) 10 to 30% by weight of hexafluoropropene, with the proviso that the quantities a+b+c make up 100% by weight, all the percent by weight data being based on the polymer.

Mixtures of the fluorine-containing, thermoplastic polymers mentioned further above can also be used, provided they have the contents of polymerized vinylidene fluoride units mentioned, only one such polymer preferably being used, however.

As already described above, pigments, fillers and reinforcement materials are suitable as additional components. It is a special feature of the process according to the invention, that it is not necessary to add materials, which contain polymerizable double bonds. In particular, it is not necessary to add compounds having two or more ethylenically unsaturated double bonds, which are normally used for the crosslinking of fluorinated polymers.

Thermoplastic, fluorine-containing polymers which are used for the process according to the invention contain no or at most one C=C double bond per macromolecule, these bonds being identifiable, for example, by infrared absorption bands in the typical range of 1590 to 1760 $cm^{-1}$. They are not elastomeric, but as already stated above, are partially crystalline having 10 to 70% by weight of crystalline proportions and are thermoplastically processable.

After being shaped, the molding is exposed to ionizing radiation. For this purpose, both corpuscular rays, such as beta-rays and electromagnetic rays, such as gamma rays, are suitable. The type of radiation, as well as its energy content, is selected expediently depending on the thickness of the molding. An energy content of $0.1 \times 10^6$ eV is generally adequate in the most often used irradiation with electron beams.

The radiation dose should be at least 50 kGy, since with lower doses no significant improvements in properties are achieved. Depending on the type of vinylidene fluoride copolymer used, degradation phenomena can occur beyond a dose of 500 kGy. Preferably, the operation is carried out with a radiation dose of 60 to 300 kGy.

A dose rate of at least 2 Gy/s should be achieved during the irradiation, since otherwise the mechanical properties of the molding also deteriorate, and preferably the operation is carried out with a dose rate of 20 to 2000 Gy/s. When comparatively small dose rates of less than 200 Gy/s are used, the operation is carried out, in a further preferred embodiment of the process according to the invention, with the exclusion of oxygen or under greatly reduced oxygen pressure, in order to repress oxidation processes.

The irradiation can be carried out in commercially available equipment, in a single or multiple exposure depending on the radiation dose to be applied, a heat treatment of the molding not being necessary.

Any type of thermoplastic shaping is suitable for the shaping process, for example extrusion, extrusion blow-molding, foaming, calendering or injection-molding. Examples of moldings are films, hoses, pipes and containers of all kinds, but also coatings of the moldings, which take up the shape of the moldings, and thus can themselves be described as moldings, for example a cable sheathing.

After the radiation treatment according to the invention the molding can be stretched and shrunk onto another molding by heating above the crystalline melting point As already mentioned above, at least one thermoplastic, fluorine-containing polymer, optionally as a mixture with up to 20% by weight, based on the mixture, of additives, can be used for the process according to the invention. Preferably, however, no additives are used or only up to 5% by weight, based on the mixture, of additives are used. It is also preferable to use thermoplastic, fluorine-containing polymers, which have a crystalline melting point of 100° to 160° C.

The moldings according to the invention can be produced relatively easily in a convenient thermoplastic processing range, have good mechanical properties and chemical resistance and do not show any discoloration whatsoever.

The following examples are intended to explain the invention in more detail:

For the sake of clarity, the results of the experiments are summarized in a table.

EXAMPLE 1

Dry granules of a terpolymer, comprising 40% by weight of polymerized units of tetrafluoroethene, 40% by weight of polymerized units of vinylidene fluoride and 20% by weight of polymerized units of hexafluoropropene (all percent by weight data being based on the terpolymer), are granulated from the melt in an extruder and the granules so obtained, at a temperature a little above the melting point of the terpolymer, are pressmolded into sheets 2 mm in thickness and measuring 100×100 mm.

These sheets are irradiated with electron (beta) rays with an energy of 3 MeV at a dose rate of 500 Gy/s, various dose levels being used. In each case a sheet is irradiated with a dose of 50, 100, 150 and 300 kGy at room temperature without cooling of the sheets. Before and after this irradiation the following parameters are measured from the sheets in each case:

the melt flow index (MFI) in g at 11 kg load and at a temperature of 250° C.; the torsional shear modulus (TSM) in N/mm$^2$ at 250° C. and the elongation at break (EB) in % at 20° C. The results are presented in the following table.

EXAMPLE 2

A sheet of the same polymers, with the same dimensions as described in Example 1, is irradiated in equipment as used experimentally for radiation sterilization, with gamma rays at a dose of 150 kGy and a dose rate of 5 Gy/s at room temperature without cooling of the sheets. Melt flow index, torsional shear modulus and elongation at break are determined before and after irradiation as described in Example 1. The values are presented in the following table.

EXAMPLES 3 to 5

The procedure is as given in Example 1, but instead of the terpolymer used there, three terpolymers of different composition are employed which have an increasing content of polymerized units of tetrafluoroethene and a decreasing content of polymerized units of vinylidene fluoride as well as increasing melting points. The exact composition can be seen from the following table. The irradiation of the sheets is carried out at room temperature without cooling, as described in Example 1, with a dose of 300 kGy and a dose rate of 500 Gy/s. The values determined before and after irradiation for melt flow index, torsional shear modulus and elongation at break can be seen from the following table.

Comparative experiment A

The procedure is as described in Example 1, but instead of the terpolymer used there, a terpolymer is used which comprises 85% by weight of polymerized units of tetrafluoroethene, 12% by weight of polymerized units of vinylidene fluoride and 3% by weight of polymerized units of perfluoropropyl perfluorovinyl ether (all percent by weight units are based on the terpolymer). This polymer has a melting point of 270° C. The sheets made from it, as described in Example 1, are irradiated with electron rays having an energy of 3 MeV at a dose rate of 500 Gy/s. The melt flow index, torsional shear modulus (at 300° C.) and elongation at break are measured before and after irradiation. At a radiation dose of 300 kGy a pronounced embrittlement of the sheet is observed, the elongation at break falling drastically.

The methods of measurement for melt flow index, torsional shear modulus and elongation at break are given further above, and the melting point of the terpolymer is determined by differential thermal analysis. The beta- or gamma-radiation source used in each case has a known dose rate. The various doses of radiation are achieved by adjusting the radiation time.

The symbols in the following table have the following significance:

| | |
|---|---|
| TFE = | percent by weight of polymerized units of tetrafluoroethene |
| VDF = | percent by weight of polymerized units of vinylidene fluoride |
| HFP = | percent by weight of polymerized units of hexafluoropropene |
| PPVE = | polymerized units of perfluoropropyl perfluorovinyl ether |
| M.P. = | melting point of the polymer |
| Dose $\beta$ = | dose of radiation given with electron (beta) rays in kGy |
| Dose $\gamma$ = | dose of gamma rays given in kGy |
| dose-r = | dose rate used in Gy/s |

The significance of the abbreviations MFI; TSM and EB are explained in Example 1. The designations "before" and "after" relate to the measurement before irradiation and after irradiation respectively

| Example or Comparison | Composition of the polymer (in % by weight) | | | M.P. C | Dose $\beta$ kGY | Dose $\gamma$ kGY | Dose-r GY/s | MFI (g/11 kg) | | TSM (N/mm) | | EB (%) | |
|---|---|---|---|---|---|---|---|---|---|---|---|---|---|
| | TFE | VDF | HFP | | | | | before | after | before | after | before | after |
| 1 | 40 | 40 | 20 | 120 | 50 | — | 500 | 25 | 0 | 0 | 0.8 | 600 | 600 |
| 1 | 40 | 40 | 20 | 120 | 100 | — | 500 | 25 | 0 | 0 | 0.9 | 600 | 550 |
| 1 | 40 | 40 | 20 | 120 | 150 | — | 500 | 25 | 0 | 0 | 1.1 | 600 | 500 |
| 1 | 40 | 40 | 20 | 120 | 300 | — | 500 | 25 | 0 | 0 | 1.0 | 600 | 500 |
| 2 | 40 | 40 | 20 | 120 | — | 150 | 5 | 25 | 0 | 0 | 1.1 | 600 | 400 |
| 3 | 55 | 30 | 15 | 155 | 300 | —* | 500 | 25 | 0 | 0 | 1.6 | 550 | 400 |
| 4 | 60 | 25 | 15 | 175 | 300 | — | 500 | 25 | 0 | 0 | 1.8 | 500 | 350 |
| 5 | 65 | 20 | 15 | 190 | 300 | — | 500 | 20 | 0 | 0 | 2.0 | 450 | 300 |
| A | 85 | 12 | 3 PPVE | 270 | 300 | — | 500 | 10 | 0 | 0*) | 1.1*) | 500 | 50 |

*)measured at 300° C.

What is claimed is:

1. A molding produced by:
   (A) thermoplastic shaping of a fluorine-containing polymer comprising polymerized units of the following monomers containing only one C=C double bond
   (a) 20% to 50% by weight of vinylidene fluoride,
   (b) 35% to 70% by weight of tetrafluoroethane,
   (c) 10% to 30% by weight of hexafluoropropene,
   with the proviso that the quantities a+b+c make up 100% by weight, the percent by weight data being based on the polymer component, said polymer having a crystalline melting point of 100° C. to 240° C. and a melt flow index of at least 1 g/10 min measured at 250° C. under a load of 11 kg, and (B) subsequently treating with ionizing radiation yielding said molding with an elongation at break of at least 250% at room temperature and a torsional shear modulus at 250° C. of at least 0.5N/mm$^2$ and having no measurable melt flow index at 11 kg load.

2. A molding produced according to claim 1, wherein the fluorine-containing polymer is admixed with one or more inert additives.

* * * * *

UNITED STATES PATENT AND TRADEMARK OFFICE
CERTIFICATE OF CORRECTION

PATENT NO. : 5,055,539
DATED : October 8, 1991
INVENTOR(S) : Rolf Hengel and Heinz Notzon It is certified that error appears in the above-identified patent and that said Letters Patent is hereby corrected as shown below:

In claim 1 (column 6, line 63) "tetrafluoroethane" should read --tetrafluoroethene--.

Signed and Sealed this

Third Day of March, 1998

Attest:

BRUCE LEHMAN

Attesting Officer *Commissioner of Patents and Trademarks*